(12) United States Patent
Li et al.

(10) Patent No.: US 8,964,845 B2
(45) Date of Patent: Feb. 24, 2015

(54) MERGE MODE FOR MOTION INFORMATION PREDICTION

(75) Inventors: Bin Li, Hefei (CN); Jizheng Xu, Beijing (CN)

(73) Assignee: Microsoft Corporation, Redmond, WA (US)

( * ) Notice: Subject to any disclaimer, the term of this patent is extended or adjusted under 35 U.S.C. 154(b) by 307 days.

(21) Appl. No.: 13/339,290

(22) Filed: Dec. 28, 2011

(65) Prior Publication Data

US 2013/0170549 A1 Jul. 4, 2013

(51) Int. Cl.
*H04N 7/32* (2006.01)

(52) U.S. Cl.
USPC .............................. 375/240.16; 375/E7.123

(58) Field of Classification Search
None
See application file for complete search history.

(56) References Cited

U.S. PATENT DOCUMENTS

| | | | |
|---|---|---|---|
| 2006/0262853 A1 | 11/2006 | Li | |
| 2007/0053441 A1 | 3/2007 | Wang | |
| 2009/0034621 A1 | 2/2009 | Joch | |
| 2010/0201870 A1 | 8/2010 | Luessi | |
| 2012/0320984 A1* | 12/2012 | Zhou | 375/240.16 |
| 2013/0101042 A1* | 4/2013 | Sugio et al. | 375/240.16 |

OTHER PUBLICATIONS

Wiegand, T, Bross, B, Han W. J., Ohm J.R., Sullivan G.J., "WD3: Working Draft 3 of High-Efficiency Video Coding", JCTVC-E603, Version 8, Jun. 27, 2011.*

Bahari et al., "Low-Power H.264 Video Compression Architectures for Mobile Communication," *IEEE Transactions on Circuits and Systems for Video Technology*, vol. 19, No. 9, pp. 1251-1261 (Sep. 16, 2009).

Bross et al., "WD4: Working Draft 4 of High-Efficiency Video Coding," JCTVC-F803_d0, 216 pp. (Jul. 14-22, 2011).

Chalidabhongse, "Fast Motion Vector Estimation Using Multiresolution-Spatio-Temporal Correlations," *IEEE Transactions on Circuits and Systems for Video Technology*, vol. 7, No. 3, pp. 477-488 (Jun. 1997).

Chiang et al., "Software and Hardware Design for Coding Depth Map Sequence With Texture Motion Information," *International Symposium on Circuits and Systems*, 2009, pp. 1052-1055 (May 24-27, 2009).

Li et al., "On merge candidate construction," JCTVC-E146, 5 pp. (Mar. 16-23, 2011).

Wiegand et al., "WD2: Working Draft 2 of High-Efficiency Video Coding," JCTVC-D503, 155 pp. (Jan. 20-28, 2011).

Wiegand et al., "WD3: Working Draft 3 of High-Efficiency Video Coding," JCTVC-E603, 215 pp. (Mar. 16-23, 2011).

Zhou et al., "A study on HM2.0 bitstream parsing and error resiliency issue," JCTVC-E0118, 8 pp. (Mar. 16-23, 2011).

* cited by examiner

*Primary Examiner* — Sath V Perungavoor
*Assistant Examiner* — Janese Duley
(74) *Attorney, Agent, or Firm* — Dan Choi; Judy Yee; Micky Minhas

(57) ABSTRACT

In one embodiment, for a current block of a first frame of digital image data, a list of motion vector prediction information for the current block is populated with candidate motion vector prediction data that includes default motion vector prediction data. In another embodiment, at least a portion of a coded video bitstream is received and a merge flag for a current block in a current frame is decoded. After the merge flag is decoded, at least one merge candidate for the current block is determined.

20 Claims, 9 Drawing Sheets

FIG. 3

FOR A CURRENT BLOCK OF A FRAME OF DIGITAL IMAGE DATA, POPULATE A LIST OF MOTION VECTOR PREDICTION INFORMATION FOR THE FRAME WITH CANDIDATE MOTION VECTOR PREDICTION DATA THAT INCLUDES DEFAULT MOTION VECTOR PREDICTION DATA — 310

MERGE MODE FOR MOTION INFORMATION PREDICTION

FIELD

The field relates to video encoding and decoding, and in particular, to motion information prediction.

BACKGROUND

As the use of video has become more popular in today's world, video has become available in a wide variety of video formats. These video formats are provided by using traditional video coding techniques that are able to compress video for storage and transmission, and are able to decompress video for viewing. Compression and decompression of video consumes computing resources and time. Although traditional video coding techniques can be used to encode and decode video, such techniques are limited and are often computationally inefficient.

SUMMARY

Among other innovations described herein, this disclosure presents various tools and techniques for encoding and decoding digital image data. For instance, certain embodiments of the disclosed technology populate a list of motion vector prediction information with candidate motion vector prediction data.

In one exemplary technique described herein, for a current block of a first frame of digital image data, a list of motion vector prediction information for the current block is populated with candidate motion vector prediction data that includes default motion vector prediction data.

In another exemplary technique described herein, at least a portion of a coded video bitstream is received and a merge flag for a current block in a current frame is decoded. After the merge flag is decoded, at least one merge candidate for the current block is determined. Also, decompressed video information for the current block is stored.

This summary is provided to introduce a selection of concepts in a simplified form that are further described below. This summary is not intended to identify key features or essential features of the claimed subject matter, nor is it intended to be used to limit the scope of the claimed subject matter. The foregoing and other objects, features, and advantages of the technologies will become more apparent from the following detailed description, which proceeds with reference to the accompanying figures.

BRIEF DESCRIPTION OF THE DRAWINGS

FIG. 3 is a flowchart of an exemplary method of populating a list of motion vector prediction information.

DETAILED DESCRIPTION

I. General Considerations

Disclosed below are representative embodiments of methods, apparatus, and systems for performing motion information prediction. The disclosed methods, apparatus, and systems should not be construed as limiting in any way. Instead, the present disclosure is directed toward all novel and non-obvious features and aspects of the various disclosed embodiments, alone and in various combinations and sub-combinations with one another. Furthermore, any features or aspects of the disclosed embodiments can be used alone or in various combinations and sub-combinations with one another. The disclosed methods, apparatus, and systems are not limited to any specific aspect or feature or combination thereof, nor do the disclosed embodiments require that any one or more specific advantages be present or problems be solved Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods, apparatus, and systems can be used in conjunction with other methods, apparatus, and systems. Furthermore, as used herein, the term "and/or" means any one item or combination of items in the phrase.

II. Exemplary Encoders and Decoders

A. Video Encoder and Decoder

Figure 1:
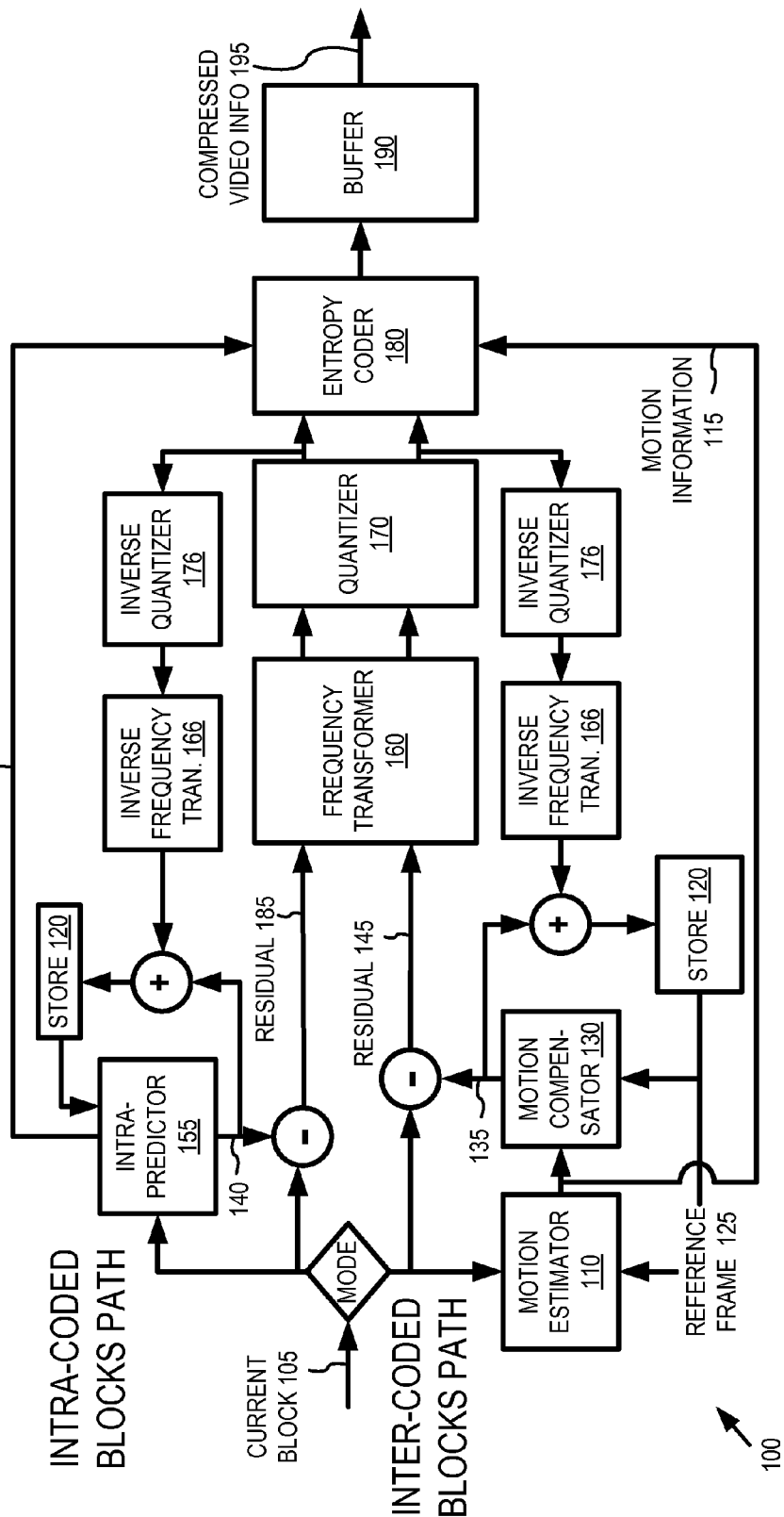
FIG. 1 is a schematic diagram of a generalized example of a suitable video encoder system for use with certain disclosed embodiments.
Figure 2:
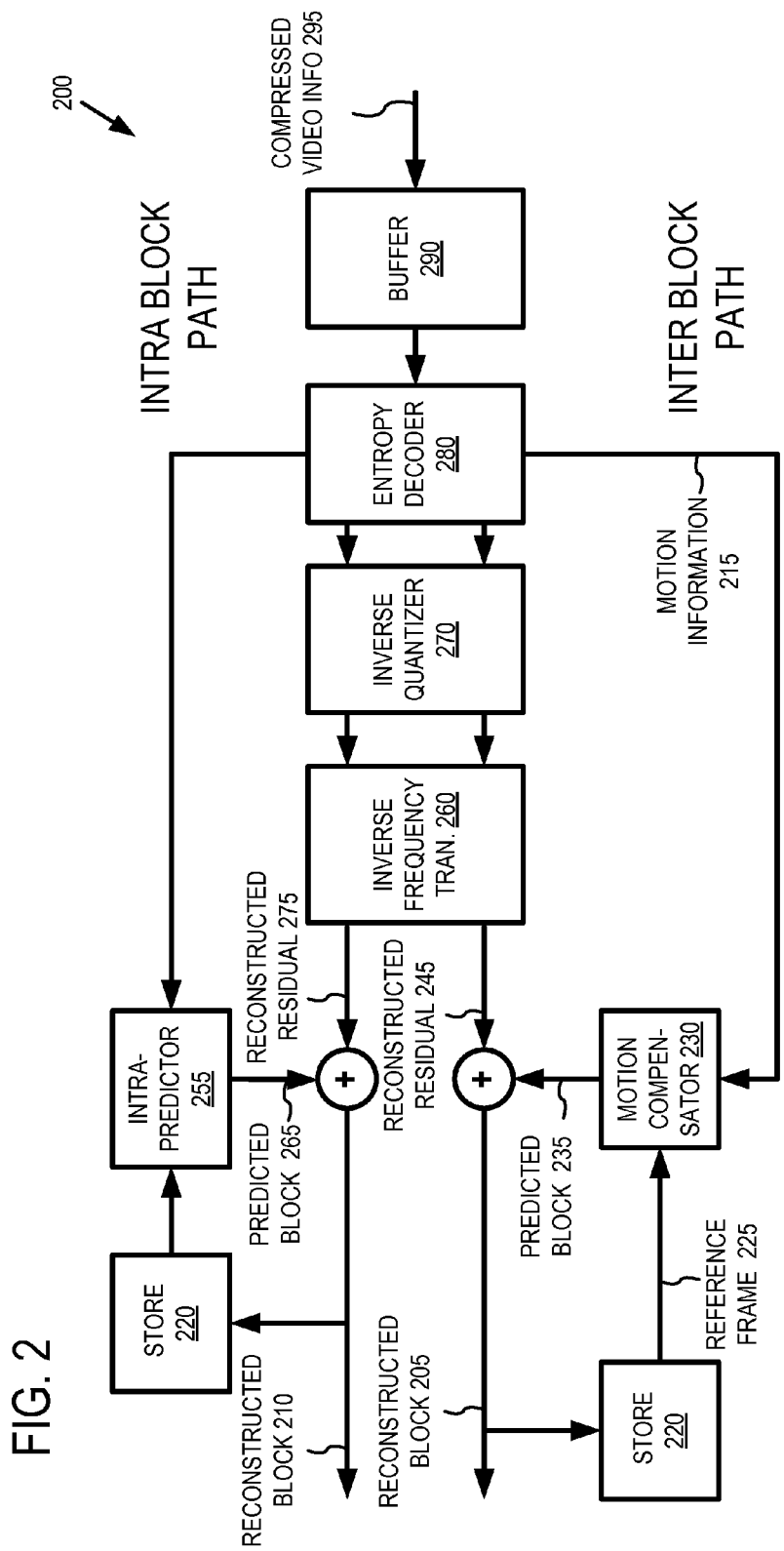
FIG. 2 is a schematic diagram of a generalized example of a suitable video decoder system for use with certain disclosed embodiments.

FIG. 1 is a schematic diagram of a generalized video encoder system 100, and FIG. 2 is a schematic diagram of a video decoder system 200, in conjunction with which various described embodiments can be implemented.

The relationships shown between modules within the encoder and decoder indicate the flow of information in the encoder and decoder; other relationships are not shown for the sake of simplicity. In particular, FIGS. 1 and 2 usually do not show side information indicating the encoder settings, modes, tables, merge flags, etc. used for a video sequence, frame, macro-block, slice, block, or other such information. Such side information is sent in the output bitstream, typically after entropy encoding of the side information. The format of the output bitstream can be the High-Efficiency Video Coding (HEVC) format or another video coding format.

Depending on the implementation and the type of compression desired, modules of the encoder or decoder can be added, omitted, split into multiple modules, combined with other modules, and/or replaced with like modules. In alternative embodiments, encoders or decoders with different modules and/or other configurations of modules perform one or more of the described techniques.

B. Exemplary Video Encoder

FIG. 1 is a schematic diagram of a generalized video encoder system 100 that can be used in connection with the disclosed technology for determining one or more merge candidates and processing one or more merge flags. The encoder system 100 receives a sequence of video frames and produces compressed video information 195 as output. For example, the compressed video information can be a compressed video bitstream or coded video bitstream, and a frame can be a picture in the sequence of pictures in the video. Particular embodiments of video encoders can use a variation or supplemented version of the generalized encoder 100.

The encoder system 100 can compress frames of a video sequence (e.g., predicted frames and key frames). For the sake of presentation, FIG. 1 shows a path for encoding blocks of a frame using inter-prediction through the encoder system 100 (shown as the inter-coded blocks path) and a path for encoding blocks of a frame using intra-prediction (shown as the intra-coded blocks path). Many of the components of the encoder system 100 can be used for compressing both inter-predicted and intra-predicted blocks. In the illustrated embodiments, components that can be shared are labeled with the same number, though it is to be understood that each path can be implemented using separate dedicated components as well. The exact operations performed by those components can vary depending on the type of information being compressed.

An inter-coded block is represented in terms of prediction (or difference) from one or more other blocks. A prediction residual is the difference between what was predicted and the original block. In contrast, an intra-coded block is compressed without reference to other frames. When encoding a block, the encoder system 100 can choose to encode the block using an inter-prediction mode and/or an intra-prediction mode.

If a current block 105 is to be coded using inter-prediction, a motion estimator 110 estimates motion of the current block 105, or sets of pixels of the current block 105 with respect to a reference frame using motion information, where the reference frame is a previously reconstructed frame 125 buffered in the store 120. In alternative embodiments, the reference frame is a temporally later frame or the current block is bi-directionally predicted. The motion estimator 110 can output as side information motion information 115 such as motion vectors, inter-prediction directions, and/or reference frame indices. A motion compensator 130 applies the motion information 115 to the reconstructed previous decoded frame (the reference frame) 125 to form a motion-compensated current block 135. The prediction is rarely perfect, however, and the difference between the motion-compensated current block 135 and the original current block 105 is the prediction residual 145. Alternatively, a motion estimator and motion compensator apply another type of motion estimation/compensation.

If the current block 105 is to be coded using intra-prediction, an intra-predictor 155 creates an intra-predicted current block prediction 140 from stored pixels of the frame that includes the current block 105, and the stored pixels are previously reconstructed pixels buffered in the store 120. The intra-predictor 155 can output side information such as intra-prediction direction 158. The prediction is rarely perfect, however, and the difference between the stored pixels and the original current block 105 is the prediction residual 185.

A frequency transformer 160 converts the spatial domain video information into frequency domain (e.g., spectral) data using a frequency transform. A quantizer 170 then quantizes the blocks of spectral data coefficients.

When a reconstructed current block or frame is needed for subsequent motion estimation/compensation and/or intra-prediction, an inverse quantizer 176 performs inverse quantization on the quantized spectral data coefficients. An inverse frequency transformer 166 then performs the inverse of the operations of the frequency transformer 160, producing a reconstructed residual. If the current block 105 was coded using inter-prediction, the reconstructed prediction residual is added to the motion-compensated current block 135 to form the reconstructed current block. If the current block 105 was coded using intra-prediction, the reconstructed prediction residual is added to the intra-predicted current block prediction 140 to form the reconstructed current block. The store 120 can buffer the reconstructed current block for use in predicting subsequent frames or blocks.

The entropy coder 180 compresses the output of the quantizer 170 as well as certain side information (e.g., motion information 115, one or more merge flags 118, modes, quantization step size, and other such information). Typical entropy coding techniques include arithmetic coding, variable length coding, differential coding, Huffman coding, run length coding, LZ coding, dictionary coding, and combinations of the above.

The entropy coder 180 stores compressed video information 195 in the buffer 190. The compressed video information 195 is depleted from the buffer 190 at a constant or relatively constant bit rate and stored for subsequent streaming at that bit rate. Alternatively, the encoder system 100 streams compressed video information immediately following compression.

The encoder 100 can produce a bitstream and determine one or more merge candidates and process one or more merge flags as described below. The encoder may also use the techniques described herein in various combinations, individually, or in conjunction with other techniques. Alternatively, another encoder or tool performs one or more encoding techniques.

C. Exemplary Video Decoder

FIG. 2 is a schematic diagram of a general video decoder system 200 that can store and use representative motion information as described below. The decoder system 200 receives information 295 for a compressed sequence of video frames (e.g., via a compressed video bitstream) and produces output including a reconstructed block 205. Particular embodiments of video decoders can use a variation or supplemented version of the generalized decoder 200.

The decoder system 200 decompresses blocks coded using inter-prediction and intra-prediction. For the sake of presentation, FIG. 2 shows a path for intra-coded blocks through the decoder system 200 (shown as the intra block path) and a path for inter-coded blocks (shown as the inter block path). Many of the components of the decoder system 200 are used for decompressing both inter-coded and intra-coded blocks. The exact operations performed by those components can vary depending on the type of information being decompressed.

A buffer 290 receives the information 295 for the compressed video sequence and makes the received information available to the entropy decoder 280. The buffer 290 typically receives the information at a rate that is fairly constant over time. The buffer 290 can include a playback buffer and other buffers as well. Alternatively, the buffer 290 receives information at a varying rate.

The entropy decoder 280 entropy decodes entropy-coded quantized data as well as entropy-coded side information (e.g., motion information 215, one or more merge flags 218, modes, and other side information), typically applying the inverse of the entropy encoding performed in the encoder. An inverse quantizer 270 inverse quantizes entropy-decoded data. An inverse frequency transformer 260 converts the quantized, frequency domain data into spatial domain video information by applying an inverse transform such as an inverse frequency transform.

If the block 205 to be reconstructed is an inter-coded block using forward-prediction, a motion compensator 230 applies motion information 215 (e.g., predicted motion information) to a reference frame 225 to form a prediction 235 of the block 205 being reconstructed. A buffer (store) 220 stores previous reconstructed frames for use as reference frames. Alternatively, a motion compensator applies other types of motion compensation. The prediction by the motion compensator is rarely perfect, so the decoder 200 also reconstructs a prediction residual 245 to be added to the prediction 235 to reconstruct block 205.

When the decoder needs a reconstructed frame for subsequent motion compensation, the store 220 buffers the reconstructed frame for use in predicting a subsequent frame. In some implementations of predicting a frame, the frame is predicted on a block-by-block basis (as illustrated) and respective blocks of the frame can be predicted. One or more of the predicted blocks can be predicted using motion information from blocks in the same frame (e.g., motion information included in spatial merge candidates) or one or more blocks of a different frame (e.g., motion information included in temporal merge candidates).

If the block 205 to be reconstructed is an intra-coded block, an intra-predictor 255 forms a prediction 265 of the block 210 being reconstructed. The buffer (store) 220 stores previous reconstructed blocks and frames. The prediction by the motion compensator is rarely perfect, so the decoder 200 also reconstructs a prediction residual 275 to be added to the prediction 265 to reconstruct block 210.

The decoder 200 can decode a compressed video bitstream, and determine one or more merge candidates and process one or more merge flags as described below. The decoder may also use the techniques described herein in various combinations, individually, or in conjunction with other techniques. Alternatively, another decoder or tool performs one or more decoding techniques.

II. Exemplary Embodiments of Performing Motion Information Prediction

A. Exemplary Method of Populating a List of Motion Vector Prediction Data

FIG. 3 is a flowchart of an exemplary method of populating a list of motion vector prediction information. In the example, for a current block of a frame of digital image data, a list of motion vector prediction information for the frame is populated with candidate motion vector prediction data that includes default motion vector prediction data at block 310. In some implementations, default motion vector prediction data is always added to the list of motion vector prediction information. In other implementations, default motion vector data is added to the list of motion vector prediction information if there is no motion vector prediction data available from one or more neighboring blocks and/or from a block of another frame of digital image data (e.g., from a reference frame). For example, during encoding or decoding (e.g., during motion vector prediction) for the current block, one or more neighboring blocks in the current frame and/or one or more blocks (e.g., a co-located block) in a different frame (e.g., another reference frame) can be checked for available motion information that can be used as candidate motion vector prediction data for the current block. If no available motion information is found or is derivable from the other blocks, default motion vector prediction data can be added to a list of motion vector prediction information for the frame. During the checking of the one or more neighboring blocks and/or the one or more blocks in a different frame (e.g., a co-located block), one or more flags (e.g., availability flags) can be set to indicate whether the one or more neighboring blocks or the one or more blocks of the second frame have or do not have available motion vector prediction data that can be used as candidate motion vector prediction data.

The candidate motion vector prediction data is sometimes referred to herein as a "merge candidate," as it represents motion vector data that can be used by a current block. Similarly, the list of motion vector prediction information is sometimes referred to as the "merge candidate list". The candidate motion prediction data can include a reference frame index value, motion vector data (e.g., an x-axis displacement value and a y-axis displacement value that together represent a motion vector), and/or prediction direction information. In some implementations, for instance, available candidate motion vector prediction data is maintained in a list of merge candidates (a merge candidate list). In certain implementations, during decoding of a current block, the possible merge candidates are derived at least by reconstructing the merge candidates for the merge candidate list from neighboring or co-located blocks that have been previously decoded.

The merge candidates can include one or more spatial merge candidates, a temporal merge candidate, and/or a predetermined merge candidate. Spatial merge candidates are merge candidates that include motion information of neighboring blocks in the same frame as the block being currently decoded (the current block). The neighboring blocks can be, for example, inter-predicted blocks that were themselves decoded using motion information. Temporal merge candidates are merge candidates that include motion information from a block (e.g., a co-located block) in a reference frame other than the frame that includes the current block. The predetermined merge candidate (also referred to as default motion vector prediction data) can be predetermined and not derived from another block in a current or different frame. In some implementations, the predetermined merge candidate includes a predetermined motion vector and/or a predetermined reference frame index which have values that are predetermined and not derived from motion information of other blocks. For example, a predetermined merge candidate can be a "zero merge candidate" (or "zero value merge candidate") that includes a zero motion vector which has zero value horizontal displacement and zero value vertical displacement (e.g., a motion vector of value (0,0) such that mv_x=mv_y=0), a zero reference frame index with a value of zero (e.g., a reference index of value 0), and/or a forward prediction direction that uses one (e.g., only one) reference frame list (e.g., a block of list0 prediction). In other implementations, the predetermined merge candidate includes one or more motion vectors of different values than a zero merge candidate, one or more reference indices of different values than a zero merge candidate and/or a different prediction direction than a zero merge candidate. In such implementations, the motion vectors, reference indices, and/or prediction directions are still predetermined and not derived from other blocks.

As noted above with respect to FIG. 3, in certain embodiments of the disclosed technology, a predetermined zero merge candidate including a zero motion vector is added to a merge candidate list for a current block. The predetermined zero merge candidate can always be added or can be added if certain criteria are met. For example, in one particular implementation, if it is determined that there are no available and/or suitable merge candidates from other checked blocks, a zero merge candidate is added to the merge candidate list responsive to the determination. In this implementation, the merge candidate list has no merge candidates in the list (e.g., the merge candidate list is empty) when the zero merge candidate is added. Adding a predetermined candidate such as a zero merge candidate to a list of merge candidates for a block allows for at least one merge candidate to be available for use during downstream encoding and/or decoding of the current block.

During encoding of the current block and after adding the zero merge candidate, a merge flag can be coded for the current block in response to there being at least one merge candidate in the merge candidate list, and the merge flag can be signaled (e.g., signaled in a coded video bitstream). In some implementations, when the number of merge candidates for a block is greater than zero, a flag is sent in the bitstream to indicate if the block is of merge mode or not. That is to say that in some implementations, a merge flag is generated for a block and sent in the bitstream when there is one or more merge candidates in a merge candidate list for the block. By adding a predetermined merge candidate to a list of merge candidates for a current block, the number of merge candidates for the current block can be (e.g., can always be) greater than zero, and a merge flag will be encoded during processing (e.g., a merge flag will always be included during encoding) of the block. In one implementation, a merge flag is set to a value indicating one of two different states. The merge flag can be set to a state that indicates that the block is to be decoded using motion information from one or more merge candidates for the block (e.g., that the block is of merge mode), or the merge flag can be set to a state that indicates that the block is not to be decoded using motion information from spatial or temporal merge candidates for the block. For example, when a block is encoded that has one or more merge candidates in a merge candidate list and one of the merge candidates in the merge candidate list is to be used to decode the block, a merge flag can be created for the block and set to a value that indicates the block is to be decoded using motion information from the merge candidate list. Also, for example, when a block is encoded that has one or more merge candidates in a merge candidate list, and the block is not to be decoded using motion information from the merge candidate list, a merge flag for the block can be created and set to a value that indicates the block is not to be decoded using motion information from the merge candidate list. In some implementations of decoding a block, a merge flag for the block is decoded and a merge candidate list is generated or not generated for the block based on the value of the merge flag. For example, in one implementation, if the merge flag indicates that the block currently being decoded is not to be decoded using motion information from a merge candidate list for the block, then the merge candidate list for the block is not generated responsive to or based on the decoded value of the merge flag, and other processing for the decoding of the block can be performed.

During decoding of the current block, and according to one implementation, a merge flag for the current block is decoded, and the populating the list of motion vector prediction information is performed responsive to at least the value of the decoded flag. In some implementations, the current block can be inferred as merge mode when the current block is the first partition of a current unit that includes more than one partition, and the current unit is larger than the smallest possible unit. In some implementations, a predetermined merge candidate can be added to a merge candidate list after a current block is inferred as merge mode, and the predetermined merge candidate can be used to provide motion information for predicting the current block. For example, if the case arises during decoding of a current block that there is no merge candidate that can be determined from neighboring blocks or a co-located block, adding a predetermined merge candidate handles this case. That is to say, adding a predetermined merge candidate provides at least one merge candidate to be used for motion information prediction for the current block when irregular cases related to merge mode arise such as when a block is inferred as merge mode but the block does not have available other merge candidates available (e.g., spatial or temporal merge candidates). That is to say, adding a predetermined merge candidate regulates the decoding process when there is no valid merge candidate for a block decoded as a merge mode block.

Figure 4:
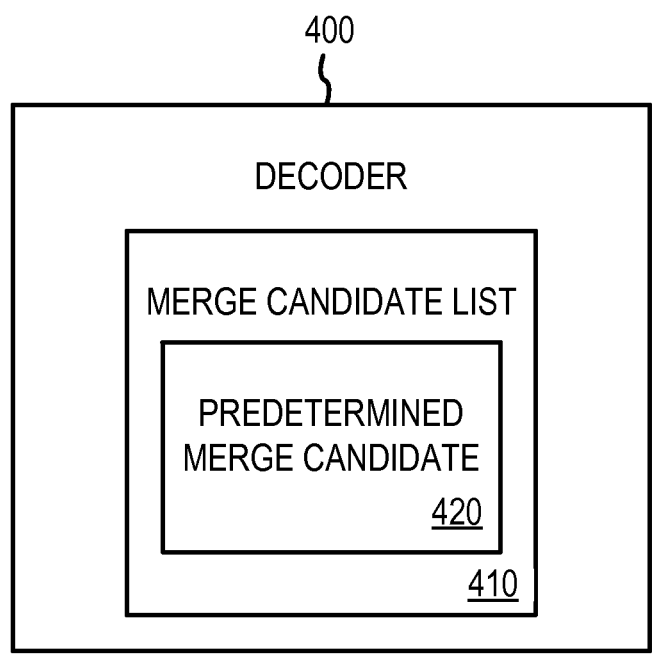
FIG. 4 is a schematic diagram of an exemplary decoder that is capable of populating a list of merge candidates with a zero merge candidate.

FIG. 4 is a schematic diagram illustrating a decoder 400 that is capable of populating a list of merge candidates 410 for a block being currently decoded with a predetermined merge candidate 420.

Figure 5:
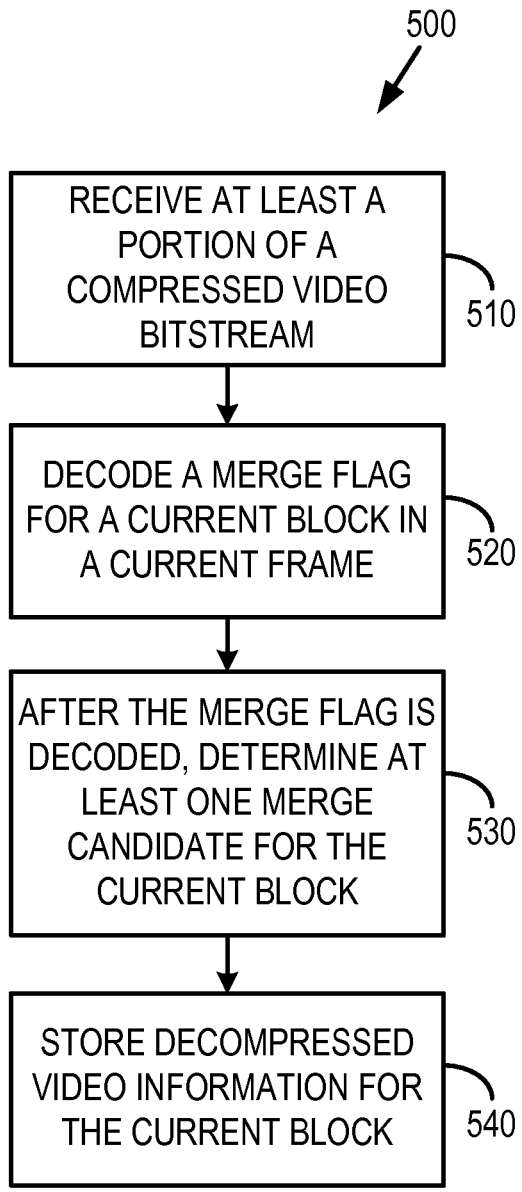
FIG. 5 is a flowchart of an exemplary method of decoding a coded video bitstream.

FIG. 5 is a flowchart of an exemplary method 500 of decoding a coded video bitstream. In the example, at least a portion of a compressed video bitstream is received at block 510. For example, a portion of a compressed video bitstream comprising coded digital image data (e.g., video information) for a current block of a current frame is received by the decoder. In one implementation, the portion of the compressed video bitstream is buffered in a buffer. At block 520, a merge flag is decoded for a current block in a current frame. For example, a coded merge flag for the current block being decoded can be received in the portion of the compressed video bitstream and decoded producing a merge flag with a value that can be evaluated. In one implementation the decoding of the merge flag is independent of the number of merge candidates in a merge candidate list. For example, the merge flag can be decoded before merge candidates for the current block are determined or a merge candidate list of the current block is created and/or populated with merge candidates. In some implementations, the decoded merge flag can have a value indicating that the current block is of merge mode or that the current block is not of merge mode (e.g., a different mode). In some video coding schemes (e.g., HEVC), merge mode is used to code the motion vector for a block. For example, a merge flag indicating that the current block is of merge mode indicates that the motion information for the current block can be predicted using motion information from at least one merge candidate. In certain implementations, the at least one merge candidate comprises motion information from at least one neighboring block, a co-located block in another frame, and/or a predetermined merge candidate. In some implementations, motion information includes a reference index, a motion vector, and/or an inter-prediction direction. In some implementations, a flag that indicates a block is of merge mode indicates that the block is predicted using the motion information from a merge candidate including merge information from another block or from a predetermined merge candidate. In some implementations, a block of merge mode is predicted using predetermined motion information because other blocks (e.g., neighboring blocks and/or a co-located block) do not have motion information that can be used as merge candidates for the current block. In some implementations, a predetermined merge candidate can be a zero merge candidate that includes a (0,0) motion vector, a reference frame index value of 0, and/or a prediction direction value indicating that the motion information is used in forward prediction (e.g., a list0 predicted block, where list0 is a reference frame list that can be used for inter-prediction of blocks that include forward predicted blocks or P blocks).

At block 530, after the merge flag is decoded, at least one merge candidate for the current block is determined. For example, a list of one or more merge candidates (a merge candidate list) can be populated or determined. In some implementations, one or more merge candidates for the current block are identified by determining whether motion information available for one or more neighboring blocks (e.g., spatial merge candidates) and/or co-located blocks from another frame (e.g., temporal merge candidates). The motion information may not be available if the neighboring block or co-located block is an intra-predicted block, in which case the block was coded without reference to a motion vector. On the other hand, motion information is typically available for a block that was inter-predicted. If motion information is available for one or more neighboring or co-located blocks, these one or more spatial or temporal merge candidates can be added to the merge candidate list. In certain implementations, a predetermined merge candidate is also added to the merge candidate list. For instance, a predetermined merge candidate can be added to the merge candidate list if the list has no merge candidates after the neighboring and co-located block from an earlier frame are checked (e.g., an empty merge candidate list). In some implementations of generating a merge candidate list, merge candidates can be deleted from the merge candidate list after being added to the list. For example, if more than one merge candidate includes the same motion information as another merge candidate, one or more of the merge candidates with the duplicate information can be deleted from the merge candidate list. Also, in some implementations of generating a merge candidate list, the merge candidates are listed in an order such that respective merge candidates in the list can be identified using an index. In some implementations of generating merge candidates for a current block, the determination of the merge candidates is based on or responsive at least in part to the value of the evaluated merge flag indicating that the current block is of merge mode. For example, a block being currently decoded can have a merge flag with a value that when evaluated indicates the currently decoded block is to be decoded using motion information from a merge candidate of the block, and in response to the evaluation of the merge flag value, one or more merge candidates for the currently decoded block are determined and included in a merge candidate list.

The motion information included in a merge candidate can be used in motion information prediction (e.g., motion vector prediction and prediction of other motion information) for the current block and for predicting the current block. For example, the motion information from a merge candidate can be used by the motion compensator 230 of FIG. 2. In some implementations of motion vector prediction, the motion information used for the current block is the same as or includes motion vector information of another block. For example, motion information of a spatial or temporal merge candidate of the block being currently decoded can be used as the motion information used during motion compensation for the block currently being decoded. In some implementations, if there is more than one merge candidate in a merge candidate list, the merge candidate used to predict the motion information for the block being currently decoded is indicated by a value of a merge index. For example, the motion information of the merge candidate located in the position of the ordered merge candidate list identified by the value of the merge index for the block can be used as the motion information for decoding the block. Further, if motion information from another block is not available, predetermined (e.g., default) motion information is used to predict the motion information for the current block. For example, the predetermined motion information is used as the motion information used during motion compensation for the bock being currently decoded. In some implementations, a block that is intra predicted or coded using intra prediction (e.g., within a frame/picture prediction) can be decoded using information from the frame that includes the block without using a motion vector, reference-frame index, or motion information from another frame. That is to say, a block decoded using intra prediction (e.g., a block of intra-prediction mode) does not have one or more motion vectors and/or reference-frame indices for predicting the block that can be available for use as motion information in a merge candidate.

In some implementations, motion information for a block that is inter-predicted can include one or more motion vectors, one or more reference indices, and an inter-prediction direction. An inter-prediction direction can indicate that a block is a forward-predicted block (e.g., a P block), or a bi-predicted block (e.g., a B block). In some implementations, a forward predicted block uses one (e.g., only one) reference frame list (e.g., list0) for predicting the block. In some implementations, a bi-predicted block uses more than one (e.g., two) reference frame lists (e.g., list0 and list1) for predicting the block. In one implementation, a block that is inter-predicted or is coded using inter-prediction (e.g., between frame/picture prediction) can be decoded using one or more reference frames in conjunction with motion information including one or more motion vectors and reference-frame indices. The one or more motion vectors and reference-frame indices used in decoding an inter-predicted block (e.g., inter-prediction mode block) can be included in the motion information for the inter-predicted block. In some implementations, for a P-frame, there can be one motion vector for a block in the frame (e.g., a P block), and, for a B-frame, there can be two motion vectors for a block in the frame (e.g., a B block). In certain implementations, a motion vector includes two components which include a horizontal displacement value and a vertical displacement value. For example, a motion vector can be a two-dimensional value, having a horizontal component that indicates left or right spatial displacement and a vertical component that indicates up or down spatial displacement. In some implementations, a reference frame index indicates which reference frame is used when multiple reference frames are available. For example, a reference-frame index can be an index into a list of reference frames (e.g., a reference frame list) that references a particular reference frame in the list of reference frames. The reference-frame index can be used to reference a reference frame that is used in conjunction with a motion vector to locate a block or other group of samples or pixels in the reference frame. In some implementations, the reference frame list is a list of reference frames that can be used in inter-prediction of another frame or block in a frame (e.g., a P or B frame or block). The reference frame can be a frame of digital image data (e.g., a video frame) that is decoded from the compressed video bitstream and that contains samples or blocks that can be used for inter-prediction of samples or blocks in another frame.

At block 540, decompressed video information for the current block is stored. For example, the decoded reconstructed block can be stored in a storage (e.g., a memory store).

Figure 6:
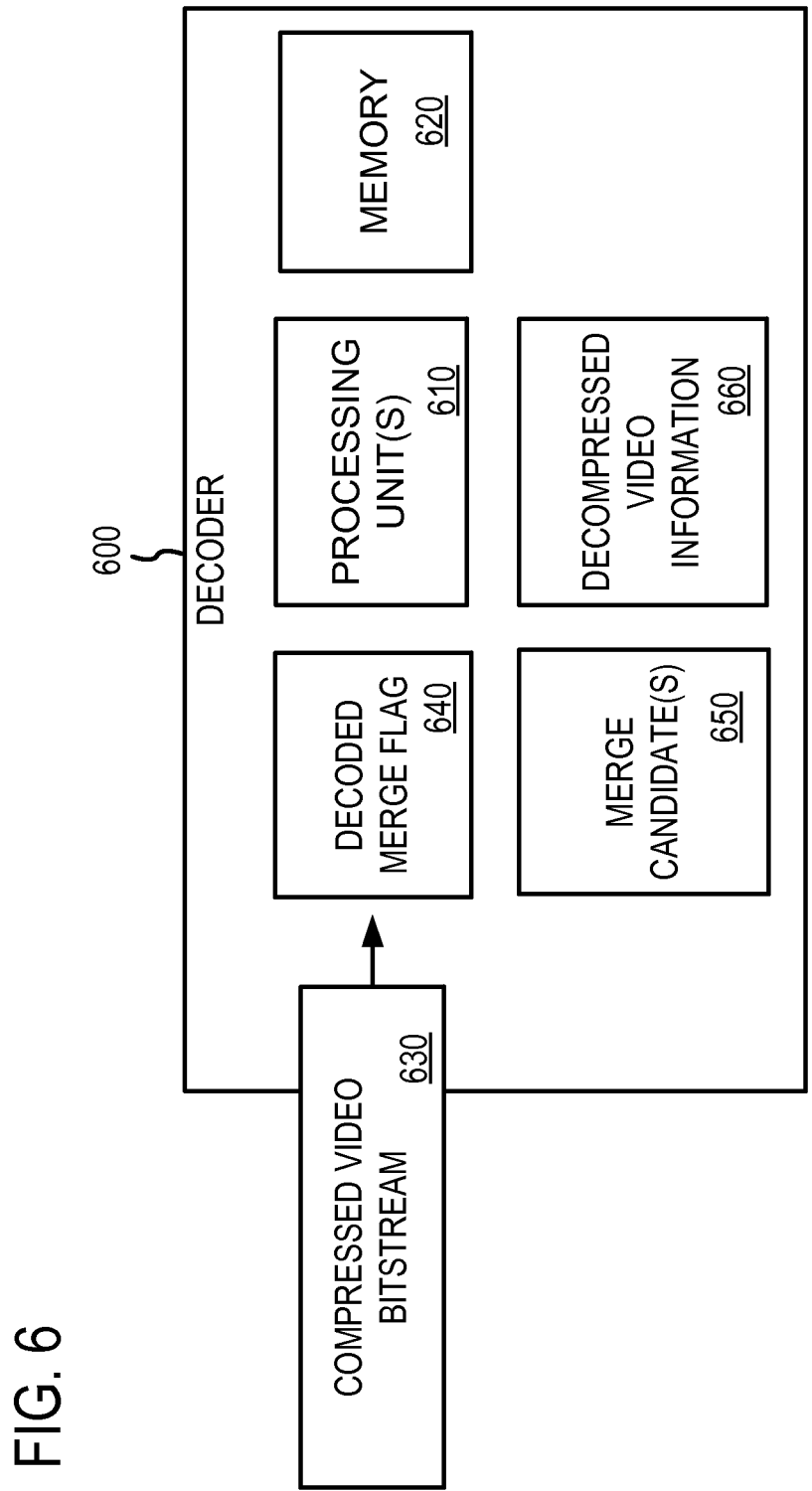
FIG. 6 is a schematic diagram of an exemplary decoder capable of decoding a compressed video bitstream.

FIG. 6 illustrates a decoder 600 capable of decoding a coded compressed video bitstream. The decoder 600 includes one or more processors 610 and memory 620. The one or more processors are at least configured to decode a compressed video bitstream such as compressed video bitstream 630. During the decoding, at least a portion of the compressed video bitstream 630 is received. A coded merge flag for a current block in a current frame is decoded from the received portion of the compressed video bitstream 630 producing a decoded merge flag 640 for the current block. After decoding the merge flag 640 for the current block, at least one merge candidate 650 is determined for the current block. Also, after the decoding of the current frame, decompressed video information 660 for the current frame is stored.

Figure 7:
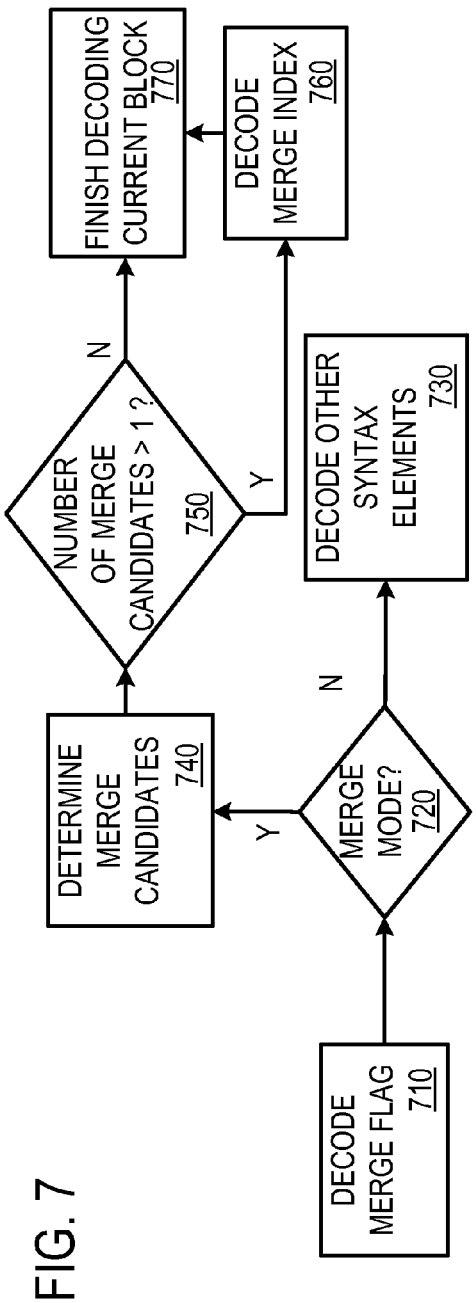
FIG. 7 is a flowchart of an exemplary method of decoding a current block.

FIG. 7 is a flowchart of an exemplary method of decoding a current block that has an associated merge flag. In the example, a merge flag for the current block is decoded at block 710. For example, a coded merge flag for the current block that is stored or received in a compressed video bitstream is decoded. In one example, the merge flag is decoded independently of the merge candidate construction and/or the number of merge candidates for the current block. For example, the merge flag can be decoded before the merge candidates for the current block are determined or reconstructed. That is to say, the merge flag can be decoded and evaluated before merge candidates are determined for the current block, and the decoding of the merge flag is not in response to the number of merge candidates for a current block being greater than zero (e.g., at least one merge candidate is available for the current block). By contrast, in some video coding schemes, the processing for reconstructing merge candidates is done before a merge flag is decoded, which adds complexity to the processing when the current block is not of merge mode. In some implementations of the illustrated method, decoding the merge flag for a block independently of the merge candidate construction process allows for blocks that are not of merge mode to be decoded without having to determine the merge candidates for the block, thereby reducing processing complexity for those blocks.

At block 720, it is determined whether or not the decoded merge flag indicates that the current block is of merge mode. For example, the value of the merge flag is checked or evaluated to determine if the value of the flag indicates that the current block is of merge mode or another mode. If the current block is not of merge mode, then other syntax elements for the current block are decoded at block 730. For example, when evaluated, if the value of the merge flag indicates that the current block is not of merge mode, other syntax elements received in the coded video bitstream are decoded for the current block. If the current block is evaluated as being of merge mode, then merge candidates are determined for the current block at block 740. For example, if the value of the merge flag is evaluated and it indicates that the current bock is of merge mode, then the merge candidates for the current block are determined by deriving one or more merge candidates from one or more neighboring blocks (e.g., spatial merge candidates), a co-located block in another frame (e.g., a temporal merge candidate), and/or adding one or more predetermined merge candidates (e.g. a zero merge candidate). In some implementations, one or more spatial merge candidates are determined from blocks that neighbor the current block. For example, a neighboring block can be a block that is above, to the left, and/or at a diagonal from the current block (e.g., to the upper left of the current block). Further, one or more temporal merge candidates can be determined from a co-located block in a different frame than the frame of the current block. For example, a co-located block in a reference frame can be checked for available motion information that can be used for a merge candidate for the current block. If the co-located block is inter-predicted using motion information, for instance, then that motion information from that co-located block can used as a merge candidate. In some implementations, the motion information for the checked blocks is stored (e.g., in a list of merge candidates) and can be retrieved. In certain instances, a neighboring block or a co-located block does not have available motion information that can be used in a merge candidate. For example, a block may not have available motion information because there is no motion information associated or stored for the block. For example, a block that is decoded using intra prediction typically has no available motion information that can be used in a merging candidate, as intra predicted blocks are not predicted using motion information.

In the illustrated embodiment, after the merge candidates are determined, the decoder makes a determination of whether or not there is more than one merge candidate at block 750. For example, the number of merge candidates in the merge candidate list is evaluated to determine if the number of merge candidates is greater than one. If it is determined that there is more than one merge candidate, a merge index is decoded at block 760. For example, if there is more than one merge candidate in the merge candidate list, then a merge index is decoded for the current block. In some implementations, the coded merge index is received in the compressed video bitstream, and when decoded the merge index identifies which merge candidate in the merge candidate list is to be used as motion information for the current block. If it is determined that there is not more than one merge candidate (e.g., if only 1 merge candidate or no merge candidate exists), then the decoding of the current block is finished at block 770. For example, if there is one (e.g., only one) merge candidate in the merge candidate list, a merge index is not decoded, and the one merge candidate is used as the motion information for the current block. If a merge index for the current block is decoded, then, after the decoding of the merge index, the syntax of merge for the current block is finished being decoded at block 770.

Figure 8:
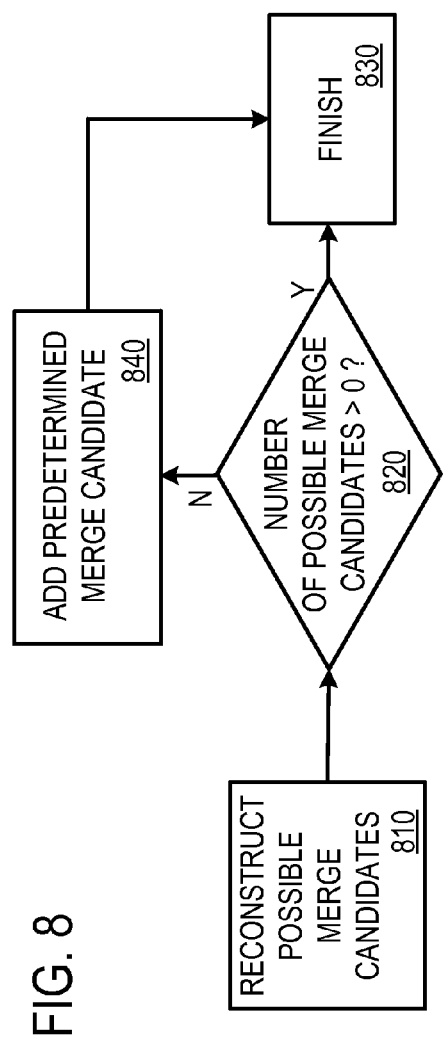
FIG. 8 is a flowchart of an exemplary method of determining merge candidates for a current block.

FIG. 8 is a flowchart of an exemplary method of determining merge candidates for a current block in a current frame. The method of FIG. 8 can be used, for example, at block 740 of FIG. 7 to determine merge candidates for the current block. In the example, possible merge candidates are reconstructed for a current block at block 810. For example, neighboring blocks to the current block in a current frame and/or a co-located block in another frame can be checked for available motion information that can be used in one or more merge candidates for the current block. For example, five blocks can be checked for motion information. Four of the five blocks are neighboring blocks that are located to the left, above (e.g., on top), at the left bottom corner, and at the right top corner. Also, in this example, one of the five checked blocks is a co-located block in a different reference frame. In some implementations a neighboring block can be located adjacent to the currently decoded block such as above the current block or to the left of the current block. Also, in some implementations, a neighboring block can be at the corner of a current block such as at a diagonal or where the two blocks share a corner (e.g., a left bottom corner or a right top corner of the current block). In some implementations, a co-located block can be included in a different frame (e.g., a different reference frame) than the current frame, and the co-located block can be co-located spatially with the current block in the current frame. In one implementation of a co-located block, a co-located block can be a block in a reference frame that has an upper-left corner or upper-left pixel or sample with the same spatial coordinates of an upper-left corner or upper-left pixel of a current block in a current frame. That is to say, the upper-left corners of the current block and the co-located block have the same spatial positions in their respective frames. In some implementations, neighboring or co-located blocks can be different sized blocks than the block in the current frame that is currently being decoded. For example, a co-located block can be a 4×4 pixel block and the block in the current frame that it is co-located with can be a block of a different size (e.g., a block having more or less pixels or samples). Also, for example, a neighboring block can be a 4×4 pixel block or some other sized block. In addition to square blocks, which have the same amount of horizontal pixels as vertical pixels, blocks can be rectangular. A rectangular block can have the same, more, or less horizontal pixels than vertical pixels (e.g., 16×32, 32×16, 16×8, 8×16 and other sizes). During decoding of the current block, the motion information of a merge candidate can be used to determine a prediction for the current block. The prediction can be an estimate of sample values or data elements of the block currently being decoded.

With reference to FIG. 8, at block 820, a determination is made by the decoder whether or not the number of possible merge candidates is greater than zero. For example, the number of merge candidates in the merge candidate list is checked to determine if one or more merge candidates are in the list after the neighboring or co-located blocks were checked for available motion information. That is to say, it is determined whether or not there is at least one possible merge candidate determined from the reconstructing of the possible merge candidates from the neighboring and/or co-located blocks. If it is determined that there is at least one merge candidate, then the method ends at block 830. If it is determined that there are no merge candidates in the merge candidate list (e.g., there is not at least one possible merge candidate), then a predetermined merge candidate is added at block 840. For example, if the number of merge candidates in the merge candidate list is zero (e.g., the merge candidate list is empty), then a predetermined merge candidate (e.g., a zero merge candidate) is added to the merge candidate list.

Figure 9:
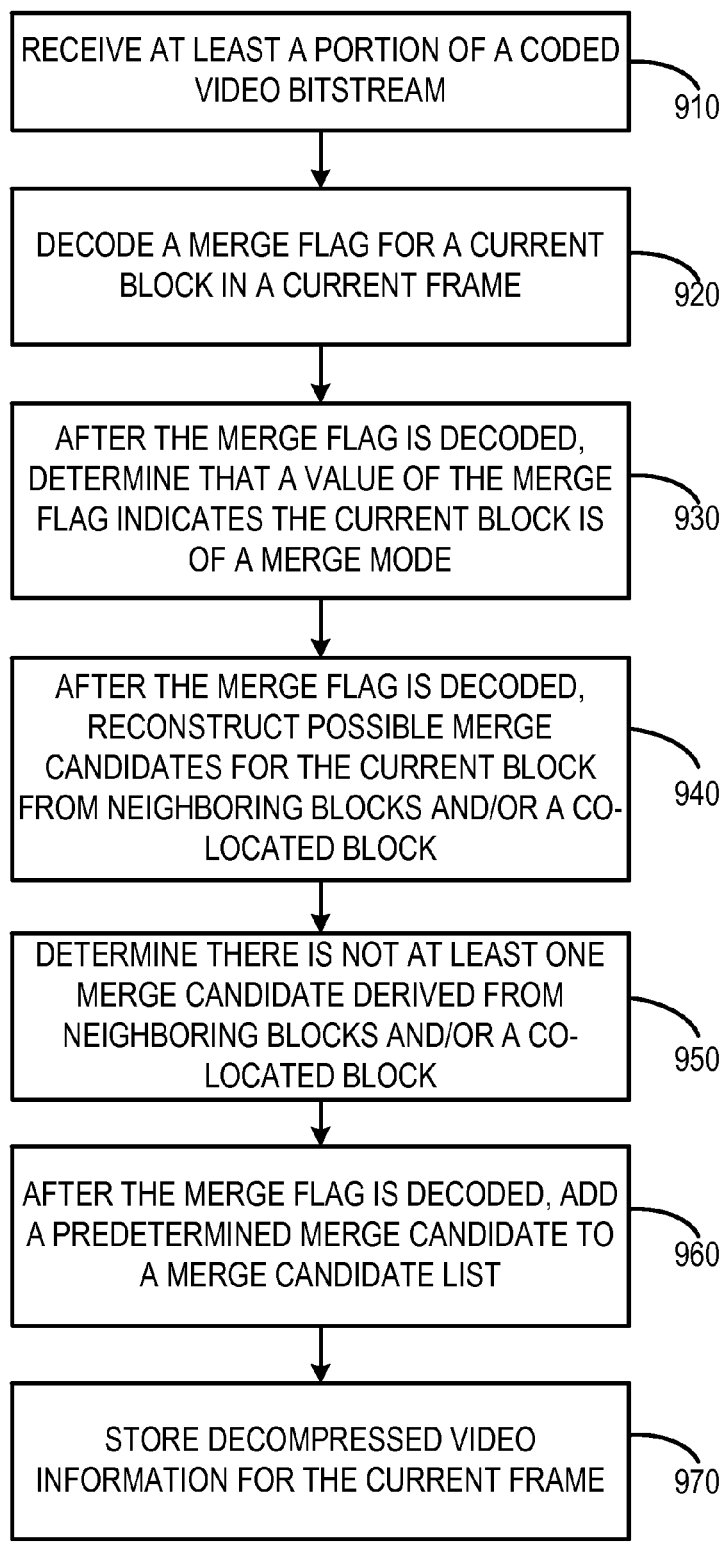
FIG. 9 is a flowchart of an exemplary method of decoding video information.

FIG. 9 is a flowchart of an exemplary method of decoding video information that can be implemented at least in part by a decoder. In the example, at least a portion of a compressed video bitstream is received at block 910. For example, a compressed video bitstream for video information can be received by a decoder and decoded or stored for decoding. At block 920, a merge flag for a current block in a current frame is decoded. For example, a merge flag from the compressed video bitstream can be decoded for the current block independently of a number of merge candidates for the current block. At block 930, after the merge flag for the current frame is decoded, it is determined that a value of the merge flag indicates that the current block is of a merge mode. For example, the value of the decoded merge flag is evaluated and the value indicates that the associated current block is of merge mode and that the block is predicted using motion information from a merge candidate. At block 940, after the merge flag is decoded, possible merge candidates are derived from one or more neighboring blocks or a co-located block for the current block. For example, neighboring blocks and/or a co-located block can be checked for available motion information and if there is available motion information, the motion information for the blocks is added to a merge candidate list by being included in one or more merge candidates that are added to the list. In certain implementations, if a checked block has available motion information, a merge candidate for the checked block is added to the list of merge candidates which includes that motion information. Also, one merge candidate can be added for each respective checked block that has available motion information. One or more flags indicating whether or not the motion information is available for the checked blocks can be set for each respective checked block. At block 950, a determination is made that there is not at least one merge candidate derived from the neighboring blocks and/or the co-located block. For example, after reconstructing the possible merge candidates from the neighboring blocks and/or the co-located block, the merge candidate list is empty and the number of merge candidates in the list is evaluated to be zero. At block 960, after the merge flag is decoded and as a result of the determination that there is not at least one available merge candidate, a predetermined merge candidate is added to a merge candidate list. For example, a zero merge candidate comprising a motion vector with a horizontal displacement value and vertical displacement value of zero is added to the merge candidate list. At block 970, decompressed video information for the current frame is stored. For example, the current frame is stored after being reconstructed, or other decompressed information for the current frame is stored.

III. Exemplary Computing Environments

Figure 10:
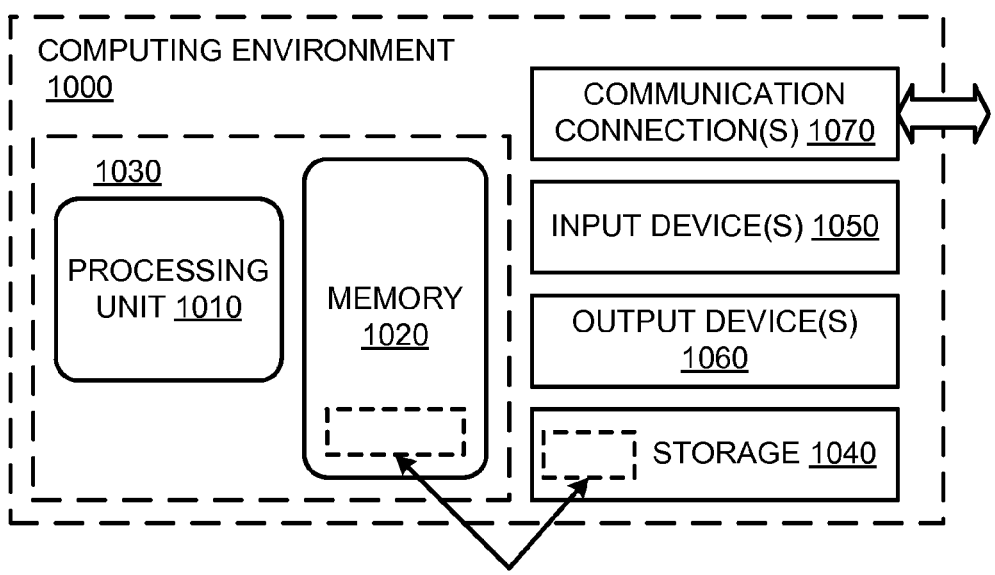
FIG. 10 is a schematic diagram illustrating a generalized example of a suitable computing environment for any of the disclosed embodiments.

FIG. 10 illustrates a generalized example of a suitable computing environment 1000 in which herein described embodiments, techniques, solutions, and technologies may be implemented. The computing environment 1000 is not intended to suggest any limitation as to scope of use or functionality of the technology, as the technology may be implemented in diverse general-purpose or special-purpose computing environments. For example, the disclosed technology (e.g., a decoder) may be implemented using one or more computing devices comprising a processing unit, memory, and storage storing computer-executable instructions implementing the technologies described herein. For example, computing devices include server computers, desktop computers, laptop computers, notebook computers, netbooks, tablet computers, mobile devices, PDA devices and other types of computing devices (e.g., devices such as televisions, media players, or other types of entertainment devices that comprise computing capabilities such as audio/video streaming capabilities and/or network access capabilities). The disclosed technology may also be implemented with other computer system configurations, including hand held devices, multiprocessor systems, microprocessor-based or programmable consumer electronics, network PCs, minicomputers, mainframe computers, a collection of client/server systems, or the like. The disclosed technology may also be practiced in distributed computing environments where tasks are performed by remote processing devices that are linked through a communications network. In a distributed computing environment, program modules may be located in both local and remote memory storage devices. Additionally, the techniques, technologies, and solutions described herein can be performed in a cloud computing environment (e.g., comprising virtual machines and underlying infrastructure resources).

With reference to FIG. 10, the computing environment 1000 includes at least one central processing unit 1010 and memory 1020. In FIG. 10, this basic configuration 1030 is included within a dashed line. The central processing unit 1010 executes computer-executable instructions. In a multi-processing system, multiple processing units execute computer-executable instructions to increase processing power and as such, multiple processors can be running simultaneously. The memory 1020 may be volatile memory (e.g., registers, cache, RAM), non-volatile memory (e.g., ROM, EEPROM, flash memory, etc.), or some combination of the two. The memory 1020 stores software 1080 that can, for example, implement one or more of the technologies described herein. A computing environment may have additional features. For example, the computing environment 1000 includes storage 1040, one or more input devices 1050, one or more output devices 1060, and one or more communication connections 1070. An interconnection mechanism (not shown) such as a bus, a controller, or a network, interconnects the components of the computing environment 1000. Typically, operating system software (not shown) provides an operating environment for other software executing in the computing environment 1000, and coordinates activities of the components of the computing environment 1000.

The storage 1040 may be removable or non-removable, and includes magnetic disks, magnetic tapes or cassettes, CD-ROMs, CD-RWs, DVDs, or any other tangible storage medium which can be used to store information and which can be accessed within the computing environment 1000. The storage 1040 stores computer-executable instructions for the software 1080, which can implement technologies described herein.

The input device(s) 1050 may be a touch input device, such as a keyboard, keypad, mouse, touch-sensitive screen, controller, pen, or trackball, a voice input device, a scanning device, or another device, that provides input to the computing environment 1000. For audio, the input device(s) 1050 may be a sound card or similar device that accepts audio input in analog or digital form, or a CD-ROM reader that provides audio samples to the computing environment 1000. The output device(s) 1060 may be a display, printer, speaker, CD-writer, DVD-writer, or another device that provides output from the computing environment 1000.

The communication connection(s) 1070 enable communication over a communication medium (e.g., a connecting network) to another computing entity. The communication medium conveys information such as computer-executable instructions, compressed graphics information, compressed or uncompressed video information, or other data in a modulated data signal.

IV. Further Considerations

Any of the disclosed methods can be implemented as computer-executable instructions stored on one or more computer-readable media (tangible computer-readable storage media, such as one or more optical media discs, volatile memory components (such as DRAM or SRAM), or nonvolatile memory components (such as hard drives)) and executed on a computing device (e.g., any commercially available computer, including smart phones or other mobile devices that include computing hardware). By way of example, computer-readable media include memory 1020 and/or storage 1040. As should be readily understood, the term computer-readable media does not include communication connections (e.g., 1070) such as modulated data signals.

Any of the computer-executable instructions for implementing the disclosed techniques as well as any data created and used during implementation of the disclosed embodiments can be stored on one or more computer-readable media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to a particular type of hardware. Certain details of suitable computers and hardware are well known and need not be set forth in detail in this disclosure.

Furthermore, any of the software-based embodiments (comprising, for example, computer-executable instructions for causing a computing device to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods can also be implemented by specialized computing hardware that is configured to perform any of the disclosed methods. For example, the disclosed methods can be implemented (entirely or at least in part) by an integrated circuit (e.g., an application specific integrated circuit ("ASIC") or programmable logic device ("PLD"), such as a field programmable gate array ("FPGA")).

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims and their equivalents. We therefore claim as our invention all that comes within the scope and spirit of these claims and their equivalents.

We claim:

1. A method of processing digital image data implemented at least in part by using a computing device, the method comprising:

for a current block of a first frame of digital image data, populating a list of motion vector prediction information for the current block with candidate motion vector prediction data, the populating comprising adding default motion vector data to the list of motion vector prediction information.

2. The method of claim 1, wherein the populating further comprises:

determining that motion vector prediction data from one or more neighboring blocks is not available; and determining that motion vector prediction data from a co-located block from a second frame of digital image data is not available.

3. The method of claim 1, wherein the default motion vector data comprises a motion vector comprising vertical and horizontal displacement values of zero; and wherein the default motion vector data comprises a reference frame index value of zero.

4. The method of claim 1, wherein the method further comprises decoding a flag signaling whether motion vector prediction is to be performed, and wherein the populating the list of motion vector prediction information is performed responsive to the value of the decoded flag.

5. A video decoder comprising:

a memory; and one or more processors, the one or more processors being configured to decode a compressed video bitstream at least by:

receiving at least a portion of the compressed video bitstream;

decoding a merge flag for a current block in a current frame;

after decoding the merge flag for the current block, determining at least one merge candidate for the current block, wherein the at least one merge candidate comprises a motion vector;

decompressing video information for the current block, the decompressing being performed at least in part using one of the at least one merge candidates; and storing the decompressed video information for the current block.

6. The decoder of claim 5, wherein the decoding of the merge flag for the current block in the current frame is independent of the merge candidates construction; and wherein the one or more processors are further configured to decode a compressed video bitstream at least by, after decoding the merge flag, determining that a value of the merge flag indicates the motion information for the current block is from one or more merge candidates for the current block.

7. The decoder of claim 5, wherein the determining the at least one merge candidate comprises adding a predetermined merge candidate to a merge candidate list.

8. The decoder of claim 7, wherein the predetermined merge candidate comprises a zero merge candidate, the zero merge candidate comprising a motion vector value of zero and a reference frame index value of zero.

9. The decoder of claim 7, wherein the one or more processors are further configured to decode a compressed video bitstream at least by determining that there are no merge candidates in the merge candidate list, and wherein the adding the predetermined merge candidate to the merge candidate list is responsive to the determining that there are no merge candidates in the merge candidate list.

10. The decoder of claim 5, wherein the one or more processors are further configured to decode a compressed video bitstream at least by:

determining that there is more than one merge candidate in a merge candidate list; and decoding at least one merge index for the current block.

11. A computer-implemented method of decoding a coded video bitstream, the method comprising:

receiving at least a portion of a coded video bitstream;

decoding a merge flag for a current block in a current frame;

after decoding the merge flag, determining one or more merge candidates for the current block, wherein each of the merge candidates comprises a motion vector;

decompressing video information for the current block using a selected one of the one or more merge candidates; and storing the decompressed video information for the current block.

12. The computer-implemented method of claim 11, wherein the determining the one or more merge candidates comprises adding a predetermined merge candidate for the current block.

13. The computer-implemented method of claim 11, wherein the decoding of the merge flag for the current block in the current frame is independent of the merge candidates construction; and wherein the merge flag signals that the current block is of a merge mode such that the motion information for the current block is obtained from one of the one or more merge candidates.

14. The computer-implemented method of claim 12, wherein the adding the predetermined merge candidate for the current block comprises adding the predetermined merge candidate to a merge candidate list.

15. The computer-implemented method of claim 12, wherein the decompressing video information for the current block comprises using the predetermined merge candidate to determine a prediction for the current block.

16. The computer-implemented method of claim 12, wherein the predetermined merge candidate comprises a predetermined reference frame index and a predetermined motion vector.

17. The computer-implemented method of claim 12, wherein the predetermined merge candidate is a zero merge candidate comprising a motion vector having a zero-value horizontal displacement and a zero-value vertical displacement.

18. The computer-implemented method of claim 11, wherein the determining one or more merge candidates comprises:

determining that there are no merge candidates from neighboring blocks to the current block or from a co-located block in a reference frame; and adding a zero merge candidate to the merge candidate list for the current block.

19. The computer-implemented method of claim 11, further comprising:

after determining the one or more merge candidates for the current block, determining that there is more than one merge candidate in a merge candidate list for the current block; and decoding at least one merge index for the current block, the merge index indicating a merge candidate in the merge candidate list that is to be used to determine a prediction for the current block.

20. The computer-implemented method of claim 11, wherein the determining the one or more merge candidates for the current block comprises:

determining that one or more spatial merge candidates from one or more neighboring blocks are not available;

determining that at least one temporal merge candidate from a co-located block from a reference frame is not available; and adding a default merge candidate to a list of the one or more merge candidates for the current block.

* * * * *